Dec. 4, 1962 D. A. PAYNTER 3,067,378

TRANSISTOR CONVERTER

Filed March 17, 1960 6 Sheets-Sheet 1

INVENTOR:
DONALD A. PAYNTER,
BY Marvin A. Goldenberg
HIS ATTORNEY.

TRANSISTOR CONVERTER

Filed March 17, 1960 6 Sheets-Sheet 2

INVENTOR:
DONALD A. PAYNTER,
BY
HIS ATTORNEY.

INVENTOR:
DONALD A. PAYNTER,
BY Marvin A. Goldenberg
HIS ATTORNEY.

INVENTOR:
DONALD A. PAYNTER,
BY Marvin D. Goldenberg
HIS ATTORNEY.

Dec. 4, 1962 D. A. PAYNTER 3,067,378

TRANSISTOR CONVERTER

Filed March 17, 1960 6 Sheets-Sheet 5

INVENTOR:
DONALD A. PAYNTER,

BY Marvin A. Goldenberg

HIS ATTORNEY.

Dec. 4, 1962 D. A. PAYNTER 3,067,378

TRANSISTOR CONVERTER

Filed March 17, 1960 6 Sheets-Sheet 6

INVENTOR:
DONALD A. PAYNTER,
BY Marvin L. Goldenberg
HIS ATTORNEY.

3,067,378

TRANSISTOR CONVERTER

Donald A. Paynter, Syracuse, N.Y., assignor to General Electric Company, a corporation of New York Filed Mar. 17, 1960, Ser. No. 15,652
26 Claims. (Cl. 321—18)

This is a continuation-in-part of applicant's copending application Serial No. 803,598, filed April 2, 1959, now abandoned, and contains further embodiments of the invention not originally disclosed in said copending application.

This invention relates to transistor converters and, in particular, to converters of a multivibrator type in which saturable reactances are energized from a source of unidirectional potential and has as an object the provision of a converter having an output which varies in response to a control signal. Such converters may be employed as regulated power supplies, amplifiers, and modulators, etc.

Transistor converter circuits have been proposed in which a pair of transistors are employed in association with a saturable core transformer in a multivibrator circuit for conversion of unidirectional potentials to alternating potentials. Conventionally a pair of transistors are employed, each connected serially between the source and one of two primary windings of a saturable core transformer. These primary windings are poled for producing opposite directions of magnetization in the core. The control electrodes of the two transistors are suitably controlled to cause said transistors to alternately assume states of high conductivity. Thus when one transistor becomes conductive, a current flows through the associated primary winding causing a magnetic flux to be established in the transformer which increases substantially linearly with respect to time until core saturation is reached. The transistor control voltage typically is derived from this magnetic flux by means of transformer feedback windings coupled to the base electrode circuits of both transistors. The coupling is arranged so that conduction upon the part of one transistor tends to drive the other transistor into a state of non-conduction until core saturation is reached. When the transformer core is saturated, there is no further flux increase in the transformer core and the induced voltage in the transformer windings disappear. This results in nonconduction of the previously conducting transistor. The resulting decrease of current through its associated winding causes a slight reduction in magnetic flux in view of the hysteresis characteristic of the core material. This reversal of core flux produces a voltage in the feedback windings of a reverse polarity to that originally produced and it is this voltage reversal which is conventionally employed to initiate conduction of the previously cut off transistor. Conduction of this transistor in turn results in a rising flux and a feedback signal which will cut off the previously conducting transistor until saturation is again reached. This cyclic activity continues and results in a square wave output at the output winding of the transformer which may be utilized in an alternating current form or may be rectified to produce a direct current output. U.S. Patent 2,826,731 entitled, "Transistor Converter," by the inventor of the present application and assigned to the General Electric Company, the assignee of the present invention, relates to a converter of the type described above. The above-described power converter has useful advantages over other forms of converters, such as the blocking oscillator type, because of its large power capability, independence of its frequency and voltage to changes in the output load, and its ability to supply a continuous power output.

It is frequently desirable to control the output of such converters. Power output control in regulated power supplies is an important application for such control. Although some control may be obtained by external control networks connected to the converter output circuitry, such networks are uneconomical merely because of the extra component parts required. Ideally output signal control should be self-contained in the converter circuitry. Additionally, it is desirable to provide a converter whose output amplitude is a direct function of the control signal and whose output varies as an amplified function of an input control signal. Such a converter has not only superior performance in regulated power supply circuits but may be utilized per se as an amplifier in a wide variety of applications.

It is therefore an object of this invention to provide an improved transistor converter whose output amplitude is directly controllable in response to an electrical input signal.

It is a further object of this invention to provide a transistor converter circuit in which a variation of input signal results in an amplified variation of output signal so as to achieve signal amplification in the converter.

It is an additional object of the invention to provide a transistor converter in which an amplitude variation of an input signal directly produces a corresponding amplified variation in the converter output.

It is a still further object of this invention to provide an improved type of carrier amplifier.

It is yet a further object of this invention to provide a regulated converter power supply system having improved regulation characteristics.

It is a further object of this invention to provide an improved transistor converter power supply having a regulated output voltage.

It is a further object of this invention to provide an improved transistor converter power supply having a regulated output current.

Briefly, in accordance with one aspect of the invention, a saturable core transformer type of transistor converter has its transformer feedback, or cut off, windings connected to the transistor base electrode circuits through unidirectional conducting devices, so that the cut off windings or circuits serve only to turn off the transistors, and wherein the "on" base driving power, i.e. the forward bias potential required for transistor conduction, is obtained from external circuitry which is independent of the cut off windings. Since the "on" base drive is independent of the cut off windings, it is possible to vary the transistor base electrode bias in accordance with an input signal and, by alternately operating a converter transistor as an amplifier, achieve signal amplification in the converter.

In accordance with a further aspect of the invention, the input signal is obtained from a feedback circuit which senses and amplifies a portion of the output voltage for providing regulation of the output voltage and/or output current.

Common-base, common-emitter, or common-collector converter configurations may be utilized which have electrical properties similar to conventional transistor amplifier stages, and the input signal controlling the converter drive may be applied in a circuit which is either in series or in parallel with the cut off circuit which serves to turn off the converters.

While the specification concludes with claims particularly pointing out and distinctly claiming the subject matter which is regarded as the invention, it is believed that the invention will be better understood as the following description is taken in connection with the accompanying drawings in which:

Figure 1:
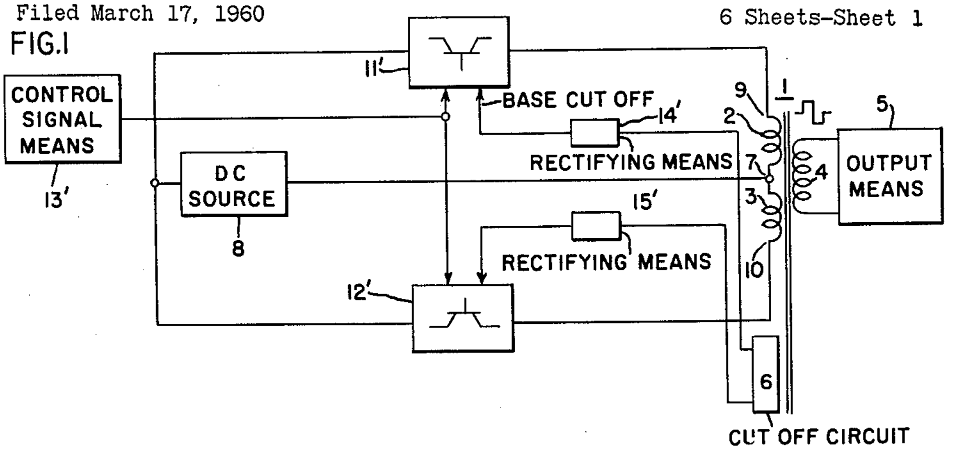
FIGURE 1 is a block diagram of a base electrode controlled transistor converter.

Referring now to the drawings, and in particular to FIGURE 1, there is shown in block diagram form a converter whose output signal corresponds in amplitude to an applied control, or input, signal. The converter includes a saturable transformer 1 having first and second primary windings, 2 and 3, which are normally equal and wound inductively on a core of the transformer. The transformer 1 also is provided with a secondary, or output, winding 4 which is connected to output means 5 and with tertiary, or cut off, windings which are illustrated in block form as cut off circuit 6.

Each of the primary windings is serially connected through the emitter and collector electrodes of a separate one of transistors 11' and 12' across a source of direct potential 8 so that each winding has opposing directions of magnetization. Thus one end terminal of each primary winding is connected through a common terminal 7 to one terminal of the source of direct potential 8. The other end terminals 9 and 10, of the primary windings are separately connected through the emitter and collector electrodes of, respectively, transistors 11' and 12' to the other terminal of the D.C. source 8. The relative connection of the emitter and collector electrodes is not shown in the block diagram since this, as is more fully discussed subsequently, is dependent upon the type of operation, the polarities of the D.C. source and the transistor types. The degree of conduction between the collector and emitter electrodes of the transistors, and thus the converter output, is determined by the bias applied to the transistor base electrodes, which bias is conventionally referenced in respect to the emitter electrodes. As suggested by FIGURE 1, both the control signal means 13' and the cut off circuit 6 are connected to the base electrodes. The cut off circuit is connected through separate rectifying means, 14' and 15' to transistors 11' and 12', respectively. The outputs of the cut off circuit 6 which are applied to transistors 11' and 12' are out of phase, so that, as in conventional converters, these transistors are alternately cut off. The rectifying means are poled so as to pass only potentials of a reverse bias polarity. Thus unlike conventional converters in which a cyclic bidirectional signal from the feedback circuit causes each transistor to alternately cut off and saturate, the cut off circuit in the presently disclosed converters can not "gate on" the transistors and cannot maintain their conduction. A separate control, or input, signal means 13', therefore is employed to control the state of conduction of the conducting one of the transistors and provides a bias to the base electrode so as to establish the proper degree of conduction.

For a description of the operation of the circuit, assume that transistor 11' initially assumes conduction because of a forward bias supplied by the control signal means 13'. The increasing flux generated by the current flow in primary winding 2 causes a voltage to be generated in the tertiary windings in cut off circuit 6 which when applied through rectifying means 15' to the base of transistor 12', cuts off that transistor. A feedback signal having a polarity opposite to that applied to transistor 12' is prevented by rectifying means 14' from being supplied to the base of transistor 11' during this time. Current will continue to flow through magnetizing winding 2 until the core of transformer 1 is saturated. At this time there is no longer an increasing flux generated so that the cut off circuit no longer provides a voltage which cuts off transistor 12'. Transistor 12' will go into conduction because of the forward bias supplied by the control signal means 13', and the increasing flux induced by the current in magnetizing winding 3 in opposition to the flux originally established will rapidly drive the cores out of saturation, and thus permit coupling of a voltage in the cut off circuit 6 of an opposite polarity to that formerly generated. This voltage when applied through rectifying means 14', to the base electrode of transistor 11', will cut off the latter. Current flow now takes place only through transistor 12' and magnetizing winding 3 until the transformer core again becomes saturated and the cycle is repeated.

It may thus be seen that in the present invention, the transistors are alternately gated on and maintained in conduction only if a forward base bias is applied by the control signal means and the cut off circuit signal is merely utilized to alternately cut off the transistors. In essence the applicant has separated the "cut off" and "gate on" functions normally supplied by the feedback circuit, so that now the control signal means performs the "gate on" function. Since the "gate on" function is separated from the circuit supplying the cut off signal, it is possible to vary the transistor drive in accordance with an input signal supplied by the control, or input, signal means 13'. Since the impedance between the collector electrode and the emitter electrode of the "conducting" transistor is a function of the base bias applied by the control signal means, the voltage applied across the primary windings during conduction of the associated transistor is an amplified function of the control signal voltage. The output signal voltage from output winding 4, applied to a load in output means 5, is a rectangular wave output whose output amplitude is a function of the voltage applied across the primary windings and thus is an amplified function of the control signal amplitude. Since the physical properties of the saturating transformer requires a given volt-seconds quantity to drive the transformer from positive to negative saturation, the output frequency will vary proportionately with the output amplitude of the square wave.

Figure 2:
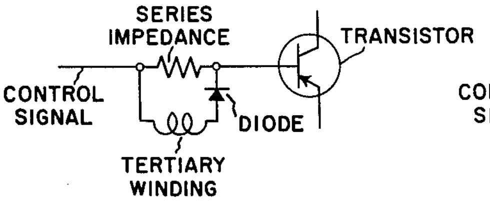
FIGURES 2 and 3 are schematics illustrating, respectively, series and shunt feed base control circuits.
Figure 3:
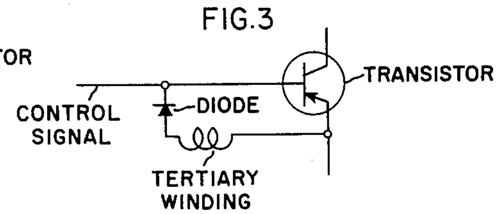

The "cut off" signals from the cut off circuit and the "gate on" control signal from the control signal means may be applied to the base electrode of the transistors either in series or in shunt. FIGURES 2 and 3 illustrate these two types of circuits respectively with the transistor in each of the circuits being one of the switching transistors of the converter, and the tertiary winding being one of the windings in the cut off circuit 6, illustrated in FIGURE 1. In the following embodiments two tertiary windings are inductively associated with the saturating transformer core, with each winding being associated with one converter transistor. The "cut off" signal may of course be obtained by means other than cut off, or feedback, windings wound on the transformer core, and the cut off windings are illustrated only as an embodiment of a "cut off" signal source. The diode is shown poled so as to supply only signals of a polarity which will cut off the transistor. In the case of the PNP type transistors illustrated, the diode is poled so that positive voltage is applied to the base electrode of the transistor when the transformer feedback voltage is positive at the winding terminal connected to the diode. A negative voltage at this terminal, which in conventional converters is ordinarily employed to turn "on" the switching transistor is prevented from doing so by the associated diodes. In the shunt feed embodiment, illustrated in FIGURE 3, the series combination of the diode and the tertiary winding is connected directly between the base and emitter electrodes of the transistor and the control signal is applied directly to the base. In the series feed embodiment, illustrated in FIGURE 2, the control signal is applied to one terminal of a series impedance whose other terminal is connected to the base electrode, and the series combination of the tertiary winding and the diode is connected across the series impedance. The base to emitter electrode return circuit is not shown.

Controlled converters may be constructed with common-base, common-emitter, or common-collector configurations in respect to the control signal input and any of these configurations may employ either series or shunt feeding of the tertiary signal to the base electrodes.

Figure 4:
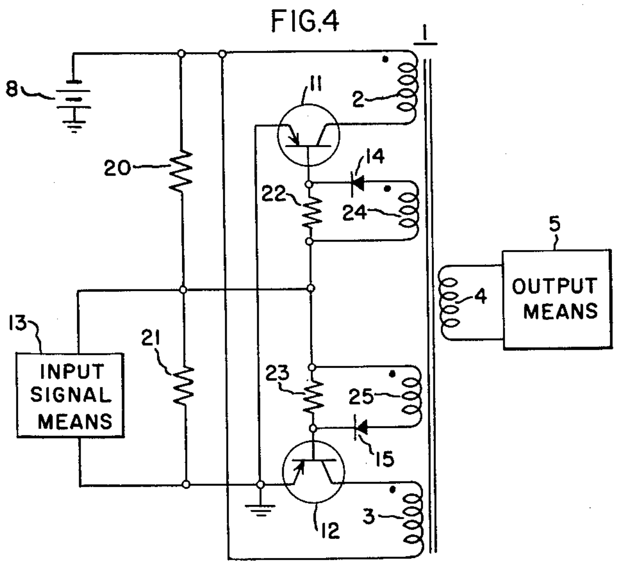
FIGURE 4 is a schematic diagram of a common-emitter converter using series feed control.

FIGURE 4 shows an embodiment of a common-emitter base controlled converter which uses the series-feed method of base control. The saturating transformer 1 has primary windings 2 and 3 which are serially connected but which are poled to effect opposing directions of magnetization upon conduction of the associated transistors. The end terminals of windings 2 and 3 are separately connected to the collector electrode of, respectively, transistors 11 and 12 and the junction of the windings is connected to a first terminal of the source of direct current 8. The emitter electrodes of both of the transistors are connected to the second terminal of source 8 so that a current path may be established from source 8 either through winding 2 and transistor 11 or through winding 3 and transistor 12. With the use of PNP type transistors, as illustrated, the first terminal of source 8 must of course be negative so as to effect proper bias potentials. Two serially connected impedances 20 and 21 are connected across source 8 with their junction being connected to the junction of series impedances 22 and 23 whose other end terminals are, respectively, connected to the base electrodes of transistors 11 and 12. The series combination of cut off winding 24 and diode 14 is connected across series impedance 22 and the series combination of cut off winding 25 and diode 15 is connected across series impedance 23 so as to provide the cut off series feed arrangement described in reference to FIGURE 2. The potential across impedance 21 thus determines the base-emitter bias of the two transistors in the absence of signals applied from cut off windings 24 and 25, and this potential may be maintained by proper selection of impedances 20 and 21 so as to provide the proper base electrode bias for transistor conduction. Input signal means 13 is connected across impedance 21, so that an input signal applied by the input signal means 13 will vary the base to emitter potential of the transistor which is not cut off by the cut off circuit. As has been previously explained, the connections of the cut off circuit are arranged so that when one transistor is conducting, by virtue of the forward base bias provided by the impedance dividers 20, 21 and the signal from input signal means 13, the other transistor is made nonconducting by the cut off bias drive from its associated cut off winding and diode. Thus in the case of the illustrated PNP transistors, assuming transistor 11 to be in conduction, a positive voltage is applied through diode 15 to the base electrode of transistor 12 so to cut off the latter.

The output winding 4 of the saturating transformer supplies a square wave output signal to output signal means 5. The output signal means is intended to include a load circuit which may be supplied directly with an alternating current signal from the output winding. Alternatively the output signal means may include rectifying means for converting the square wave signal into a direct current output which is applied to the load. Either half wave or full wave rectifying means may be employed for this purpose.

A cycle of operation is as follows. Assuming transistor 11 is initially conducting, transistor 12 will be cut off due to a positive potential which is applied to its base electrode by feedback winding 25 and diode 15. Transistor 11 will conduct until the transformer core saturates, whereupon transistor 12 is no longer cut off by the cut off winding output and will go into conduction if a sufficient forward bias potential appears across impedance 21. Transistor 11 is then cut off by its associated cut off winding 24 and transistor 12 will conduct proportionate to the forward base bias supplied across impedance 21 until the transformer core saturates at which time the cycle repeats. If the output from winding 4 is utilized in the form of alternating current or is rectified by the full wave rectifier, both transistors contribute to the load power on a half time basis.

The fraction of a source voltage which is applied across the magnetizing windings of the transformer, and which determines the converter output amplitude, is dependent on the transistor base drive provided by the impedance network of impedances 20 and 21 and by the amplitude of the input signal supplied by input signal means 13. The impedance network 20 and 21 may be suitably adjusted so that, for example, the base current has an amplitude so as to supply one half of the source voltage across the primary windings. A signal voltage supplied from the input signal means 13 can add to or subtract from this base drive and cause more or less of the source voltage to be applied to the transformer. Accordingly, the output amplitude of the square wave signal supplied by output winding 4 rises and falls, and, the output voltage waveform appears, across winding 4, as an amplitude modulated wave modulated in response to the input signal supplied by input signal means 13. Since the transistor collector circuits furnish the output load power and the input feeds the low power base circuits, power amplification of the signal can be realized.

It should be noted that the base drive network, including impedances 20, 21 and control signal means 13, only represents one type of base drive. Other forms of base drive may be designed in accordance with standard transistor design practices. The quiescent base drive bias level may be inherent in the signal supplied by the input signal means 13, in which case voltage divider 20 and 21 is superfluous. Alternatively a quiescent base bias may be obtained from a voltage source in the base-emitter electrode circuit. The quiescent bias level may of course be varied to conform to the type of operation desired. Further reference as to class A, B, and C type of operation is discussed subsequently.

Figure 5:
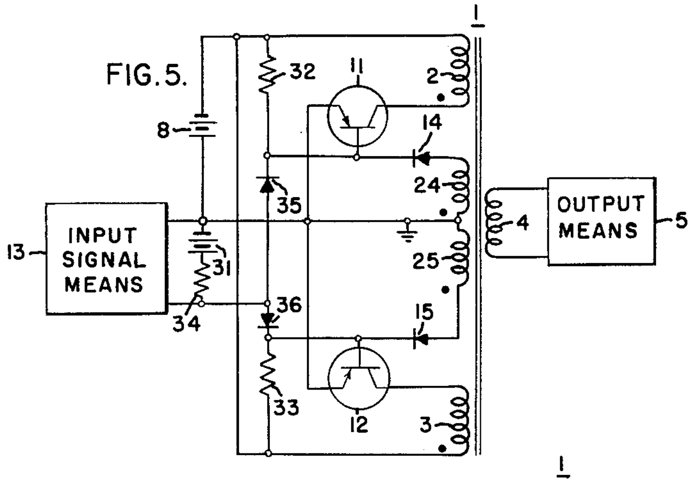
FIGURE 5 is a schematic diagram of a common-emitter converter using shunt feed control.

A common-emitter converter using the shunt feed method is illustrated in FIGURE 5. Parts corresponding to those previously employed are designated by the same numbers in this as in subsequent figures. A source of potential energy 8 is connected, as in the circuit of FIGURE 4, serially with primary winding 2 and the collector and emitter electrodes of transistor 11, and is also connected serially with primary winding 3 and the collector and emitter electrodes of transistor 12. Cut off windings 24 and diode 14 are serially connected across the base and emitter electrodes of transistor 12 so as to provide the cut off shunt feed arrangement described in reference to FIGURE 3. Impedances 32, 33 and 34, diodes 35 and 36 and D.C. source 31 are elements of the base divider circuit which provides the base drive for the transistors. Impedances 32 and 33 are connected from the negative terminal of source 8 to the base electrode, respectively, of transistors 11 and 12. Diodes 35 and 36 are connected back-to-back between the base electrodes of the transistors and have their anodes connected together. A series network of impedance 34 and a second source of direct current 31 is connected between the junction of the emitter electrodes of transistors 11 and 12 and the junction of the anodes of diodes 35 and 36. Impedance 34 is thus connected serially with source 31 through diodes 35 and 36, respectively, to the base electrodes of transistors 11 and 12. The base divider elements 31–36 are connected so that the base drive circuit of each of the transistors is a series network connected across source 8 including source 31, impedance 34, and the diode and impedance connected to the respective base electrode. Both diodes 35 and 36 are poled for forward conduction in respect to the potential source 8. The base drive is thus determined by the voltage drop across the series networks, 31 and 34. Input signal means 13 is connected across this series network so that its signal output will vary the degree of conduction of the transistor not cut off by the cut off or feedback circuit, in the manner discussed in reference to FIGURE 4. Diodes 35 and 36 are interposed between the base electrodes of the transistors so as to prevent the "cut off" signals, applied from the cut off windings to a transistor from being coupled to the base of the other transistor. For example when transistor 11 is conducting, a positive potential is applied from cut off winding 25 through diode 15 to the base electrode of transistor 12. The cathode potential of diode 36 thus is more positive than the anode potential. This prevents conduction of the "cut off" signal to the base electrode of transistor 11. Source 31 has been employed to establish the proper quiescent bias potential on the diodes but is not essential for circuit operation.

The operation of this circuit is similar to that of the common-emitter series feed circuit illustrated in FIGURE 4 in that a fraction of the voltage of source 8 appears across the primary windings as determined by the base drive supplied by the input signal means and the base divider circuit.

Figure 6:
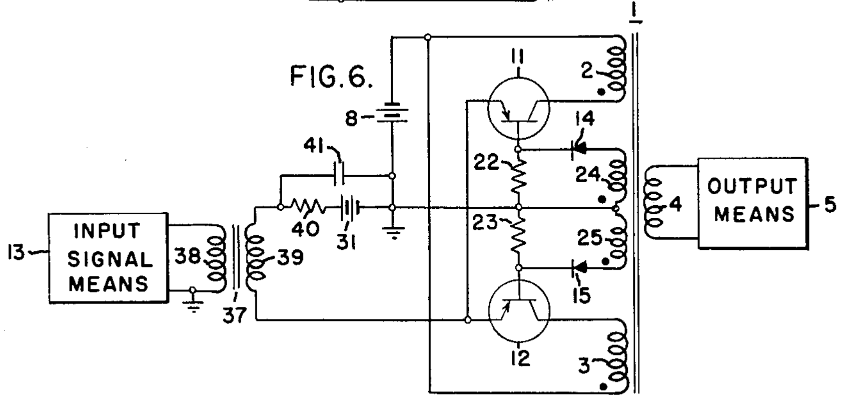
FIGURE 6 is a schematic diagram of a common-base converter employing series feed controls.
Figure 7:
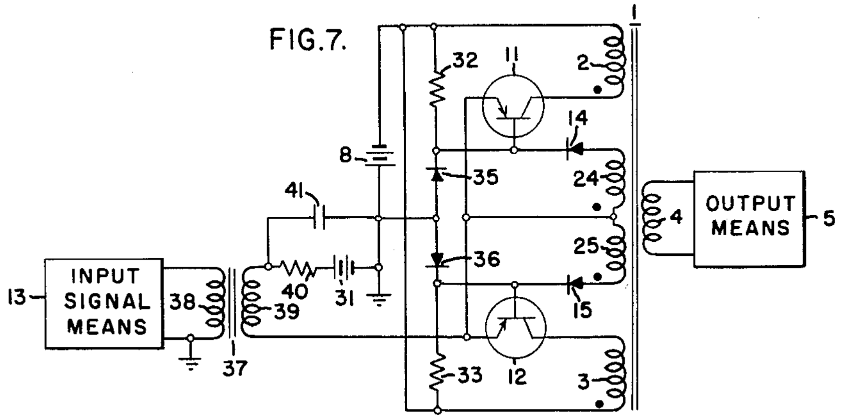
FIGURE 7 is a schematic diagram of a common-base converter employing shunt feed control.

Occasionally it may be desirable to utilize the characteristics of a common-base amplifier in the base drive circuits of the converters of this invention. FIGURES 6 and 7, respectively, illustrate series and shunt feed forms of such common-base converter amplifiers. The electrical properties of these circuits are in many ways similar to those of conventional common-base connected amplifier stages. Thus, the input impedance at the transistor is low as compared with the other configurations, and the output impedance is high. Only voltage gain is available considering the output to be at the transistor collectors so that somewhat less power gain is obtained than with the common-emitter converter amplifier. It should be noted that with respect to the converter carrier frequency operation, the transistors are connected in the common-emitter configuration.

The series feed common-base converter amplifier, illustrated in FIGURE 6, has the series circuit of D.C. source 8, secondary winding 39, impedance 40 and a second source D.C. potential 31 connected across the series combination of primary winding 2 and the collector and emitter electrodes of transistor 11, and also the series combination of primary winding 3 and the collector and emitter electrodes of transistor 12. The primary winding energization circuit thus differs from that of the common-emitter converter, in that the series combination of secondary winding 39 of transformer 37, impedance 40, and source 31 is connected serially with the source 8. The junction of source 8 and this series combination is connected through series feed impedances 22 and 23, respectively, to the base electrodes of transistors 11 and 12. The base-to-emitter circuit of each transistor thus includes in addition to its series feed resistance the above-mentioned series combination. Source 31 establishes the proper quiescent bias and impedance 40 provides the proper magnitude of impedance in the base-emitter circuit. Transformer 37 is employed to match the input signal means 13, which is connected to primary winding 38 of the transformer, to the low input impedance of the converter transistors. Capacitor 41, connected across impedance 40 and 31, effectively by-passes these components in respect to the input signals. The cut off windings 24 and 25 are connected across series feed impedances 22 and 23 in the manner previously described.

The shunt feed common-base converter amplifier, illustrated in FIGURE 7, has a primary winding energization circuit which corresponds to that of the series feed common-base converter. Input signal means 13 is similarly coupled through transformer 37 to the base-emitter circuit with secondary winding 39 being connected in series circuit with impedance 40 and source 31 between the jointly connected emitter electrodes of the transistors and a first terminal of source 8. Impedances 32 and 33 are connected from a second terminal of source 8, respectively, to the base electrode of transistor 11 and the base electrode of transistor 12. Diodes 35 and 36 are connected back-to-back between the transistor base electrodes with their anodes being connected to the first terminal of source 8, and serve to decouple the "cut off" signal in the manner described in reference to the shunt feed common-emitter converter. The cut off winding circuits 24 and 25 and diodes 14 and 15 are connected across the base-emitter electrodes of the transistors as in the other shunt feed configurations. The quiescent bias level of the base drive circuit is determined primarily by bias source 31.

Figure 8:
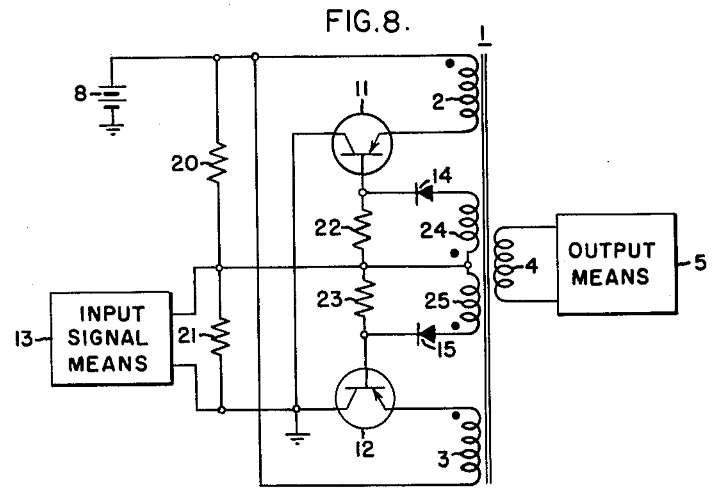
FIGURE 8 is a schematic diagram of a common-collector converter employing series feed control.
Figure 9:
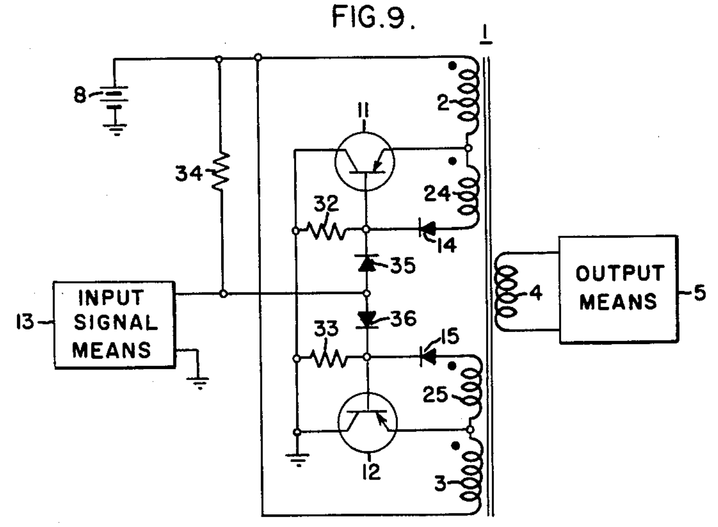
FIGURE 9 is a schematic diagram of a common-collector converter employing shunt feed control.

It is occasionally desirable to employ common-collector type of base-controlled converter amplifiers, either of the series feed configuration, as illustrated in FIGURE 8, or of the shunt feed configuration, as illustrated in FIGURE 9. The electrical characteristics of these amplifiers are similar to those of conventional common-collector amplifier stages. The input impedance is high as compared with the other configurations, and the output impedance referred to the transistor emitters is low. Only current gain is available from the transistors, and the power gain obtainable is less than with the other circuits. It should be noted that in respect with the converter carrier frequency, the shunt feed method involves common-emitter operation of the transistors whereas the series feed method involves common-collector operation.

The primary winding energization of the common-collector converters is provided, as in the other configurations, by source 8 which is in a series circuit with primary winding 2 and the collector and emitter electrodes of transistor 11 and is also in series circuit with primary winding 3 and the collector and emitter electrodes of transistor 12. The energization circuit differs over the previously discussed configurations because the primary windings are connected between the emitter electrodes, and a first terminal of source 8, and are thus in the base-emitter circuits of the transistors. The collector-electrode are connected to a second terminal of source 8. In the series feed configuration of FIGURE 8, the quiescent base bias for the base electrodes is established by impedances 20 and 21 which are serially connected across the source 8, and whose junction is applied through series feed impedances 22 and 23 to the base electrodes of transistors 11 and 12. The input signal means 13 is connected between this junction and the common-collector electrodes.

It may be noted that the primary winding energization circuit of the shunt feed common-collector converter, illustrated in FIGURE 9, conforms to that of the corresponding series feed configuration. The base drive network includes impedances 32-34 and diodes 35 and 36 which are connected back-to-back across the base electrodes. Impedances 32 and 33 are connected between the collector and base electrodes of, respectively, transistors 11 and 12 and impedance 34 is connected from a first terminal of source 8 to the junction of the diodes. The quiescent bias level is thus determined for each transistor by the ratio of impedance 34 and the respective one of impedances 32 and 33. The input signal means 13 is connected between the junction of the diodes and the collector electrodes. As has been indicated previously the base drive circuits which are disclosed constitute only one of several possible configurations. Additionally it should be noted that the quiescent bias may be arranged for the desired type of amplification, such as class A, B, or C.

Figure 10:
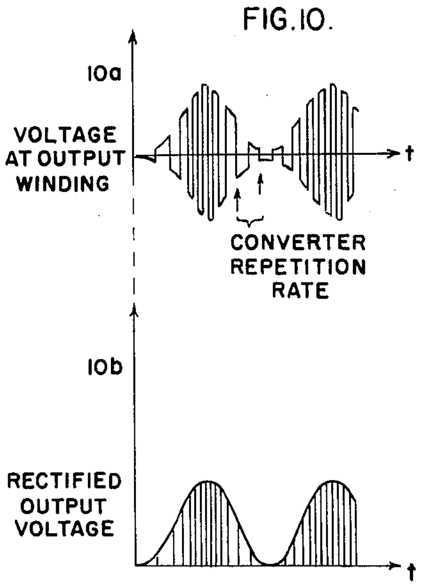
FIGURES 10 through 13 are graphs of waveforms in a voltage-time coordinate system, illustrating the converter output waveforms for different types of input signals.
Figure 11:
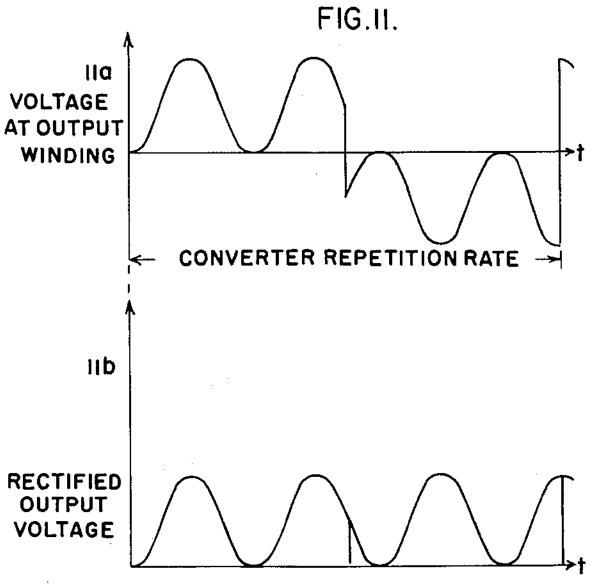

From the preceding discussion of base-controlled converter circuits it may be seen that a direct current signal or an alternating current signal, supplied by the input means, will appear in amplified form at the output signal means, and that the converter may be operated essentially as a class A, B, or C amplifier. FIGURES 10 and 11 illustrate output waveforms which may be obtained when the converter bias conditions are arranged for class A service, and when a sine wave input is applied to the converter. The sine wave input signal may have a maximum amplitude to result in a peak-to-peak output waveform which extends over the entire linear amplifying region of the transistor characteristics. FIGURE 10 illustrates the case where the input signal frequency is below the converter frequency. The instantaneous output voltage varies linearly with input voltage and the converter carrier frequency varies from a low value when the instantaneous signal output voltage is a minimum to a high value when the output is maximum. FIGURE 10*a* represents the output signal appearing at output winding 4 and FIGURE 10*b* represents the same output signal subsequent to rectification. Base-controlled converters are advantageous for low frequency amplification because the transformer size is dependent only on the carrier frequency and thus may be substantially smaller than a transformer which is dependent on the input signal frequency. Since the amplification is performed instantaneously in a linear manner, it is also possible to amplify signals which have frequencies above the converter carrier frequency. This condition is illustrated in FIGURE 11 which illustrates the case where the input signal frequency is higher than the carrier frequency. If the signal appearing at the output winding, as illustrated in FIGURE 11*a*, is rectified by a full wave rectifier, the output, as illustrated in FIGURE 11*b*, is a reproduction of the input signal.

Figure 12:
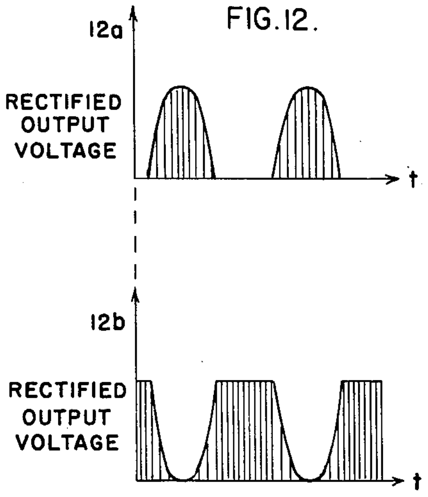

If class B operation is desired, the quiescent base-bias may be arranged so that an output signal appears for every other half cycle of the input signal. There are two bias possibilities for this condition, one corresponding to zero D.C. output across the load for a zero signal input, as illustrated in FIGURE 12*a*, and the second corresponding to full direct current output with no input signal, as illustrated in FIGURE 12*b*, assuming in each case that the signal from the output winding 4 is rectifide before being applied to a load. The choice is dependent on the application. Usually, the zero output condition is chosen in the interest of conserving standby power. However, there are situations when the D.C. output can be utilized when no signal is present, and the full output bias condition may be desirable.

Class C operation corresponding to signal output during fractional portions of the signal cycle may also be realized with the converter amplifier provided sufficient input signal amplitude and appropriate bias conditions are used.

Figure 13:
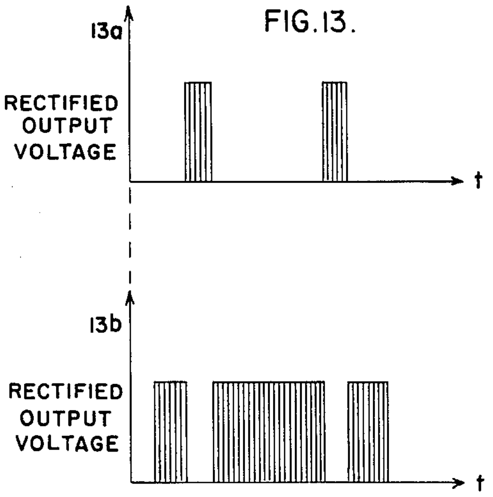

FIGURE 13*a* illustrates class C operation with the converter biased for a zero standby output and FIGURE 13*b* illustrates the condition where the converter is biased for full standby output.

The range of applications of the base-controlled converter is large in view of the unique linear amplification property exhibited by the converter, which enables the converter to supply an output signal whose amplitude is an amplified reproduction. It is of course possible to modify the input signal means to contain additional signal modifying means, such as amplifiers and/or voltage and current comparison means, so as to suit a particular application. For example base-controlled converters may be readily employed in regulated power sources where it is desired to convert a low voltage unregulated D.C. to high voltage well regulated A.C. or D.C. This function has been performed with a conventional D.C. converter operating in conjunction with a D.C. regulator in which the converter transistors act only as gating switches and in which additional transistors serve only as regulators. Since the base control converter exhibits both linear and switch characteristics, it is possible to combine the functions of regulation and conversion in one converter. A reduction in the number of transistors and other components over those required in prior art systems can, therefore, be realized.

Figure 14:
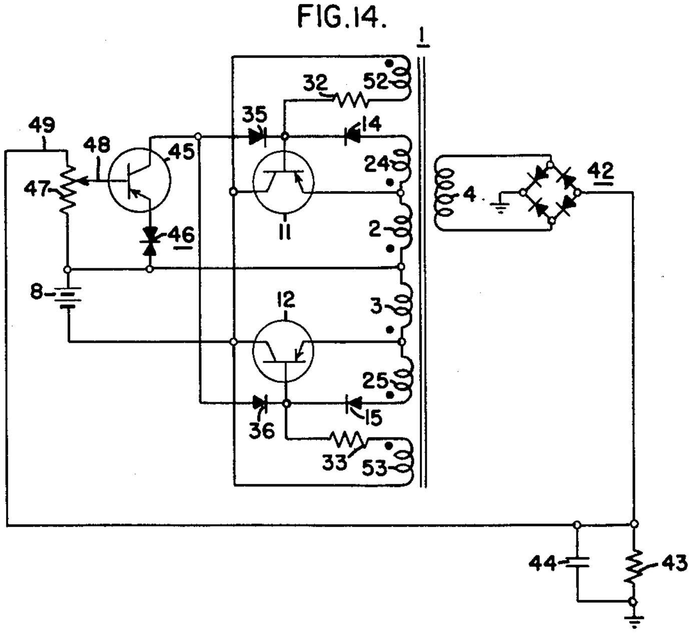
FIGURE 14 is a schematic diagram of a transistor converter employed as a series regulator with output regulation.

FIGURE 14 shows one embodiment of a base-controlled converter which provides a regulated output voltage. The converter is illustrative of the common-collector shunt feed type previously described but illustrates the application of additional input signal amplification in the form of a third transistor 45, which is employed in lieu of the impedance 34 illustrated in FIGURE 9. The energizing circuit for the magnetizing windings 2 and 3 corresponds to that of the common-collector converter previously described. The converter output winding 4 is connected across a bridge rectifier 42 whose rectified output is connected across load resistances 43. A filter capacitance 44 may be connected across the load. The base drive circuit includes Zener reference diode 46, transistor 45, diodes 35 and 36, impedances 32 and 33 and feedback winding portions 52 and 53. The circuit also includes the cut off windings 24 and 25 and diodes 14 and 15 connected as described in reference to FIGURE 9. The series combination of Zener diode 46 and transistor 45 is connected from the positive terminal of source 8 through, respectively, diodes 35 and 36 to the base electrodes of transistors 11 and 12, with the Zener diode being in the emitter circuit of transistor 45. Impedances 32 and 33 which perform the same function as the corresponding impedances of FIGURE 9, are connected serially between the base and collector electrodes of the transistors with boost windings 52 and 53, which may be optionally employed for purposes subsequently described. The voltage across the network of Zener diode 46 and the collector-emitter circuit of transistor 45 controls the converter output, in similar fashion to the voltage across impedance 34 of the circuit of FIGURE 9. The Zener diode 46 operates in a reverse direction and acts as a constant voltage impedance, as is more fully described in the copending application for Letters Patent, Serial No. 528,172, filed August 15, 1955, now Patent No. 2,983,863, of Edward Keonjian, which application is assigned to the assignee of the present invention. A portion of the converter output voltage is applied to the base of transistor 45. Conductor 49 supplies the output voltage across potentiometer 47, whose adjustable arm 48 is connected to the base electrode of transistor 45. The potential applied between the base and emitter electrodes thus corresponds to the difference between the portion of the output voltage appearing at arm 48 and the constant potential across Zener diode 46. As has been described, the emitter-collector circuit of transistor 45 is connected with an associated collector impedance, comprising impedances 32 and 33 and boost windings 52 and 53, across source 8, and the collector electrode is coupled through diodes 35 and 36 to the base electrodes of transistors 11 and 12. Thus a variation of base-emitter potential of transistor 45, by varying the collector potential of transistor 45, directly controls the base electrode potential of transistors 11 and 12.

Diodes 35 and 36 effectively switch the collector of transistor 45 from the base of one of the converter transistors to the base of the other during converter operation. Thus, transistor 45 is connected at any given time to the base electrode of the switching transistor which is conducting at that time.

Winding portions 52 and 53 have been added to increase the negative bias voltage available to base resistors 32 and 33, respectively, so as to allow an increase in the impedance magnitude of these resistors for a given base current. This raises the collector load impedance of the transistors 45, and thus increases its gain with consequent improvement in regulating characteristics. The phasing of windings 52 and 53 is arranged so that negative voltages are applied to the resistors of the conducting transistor.

In operation, it may be seen that because of the common-collector connection, the emitters of transistors 11 and 12 which are connected to the transformer primary windings 2 and 3, must assume very nearly the potentials of their base electrodes during transistor conduction. Thus, the base potentials effectively determine the potential applied to the primary windings. The base electrode potentials, however, are dependent upon the divider potentials, and since transistor 45 is a portion of the base drive divider circuit, the conduction of this transistor controls the primary winding voltage. The degree of conduction of transistor 45 is determined by the base electrode voltage as compared to the potential drop across the Zener diode in the emitter circuit. If the base electrode voltage, which is a fixed fraction of the voltage to be regulated, exceeds the reference voltage, then the conduction of transistor 45 is increased, and this reduces the base electrode potential applied to transistors 11 and 12. This base drive potential is reduced until the regulated voltage output appearing across load 43 adjusts to a value which will produce a minimum of base electrode to emitter-electrode voltage of transistor 45. Any deviation of the regulated voltage from this value will cause a variation of a base drive so as to oppose the change, and hence, a uniform regulated voltage is maintained.

A review of the circuit of FIGURE 14 indicates that transistors 11 and 12 serve as linear series regulators driven by an error signal generated by amplifying transistor 45. Transistors 11 and 12 simultaneously serve to switch the incoming direct current for conversion to other voltage levels. Since the regulation is performed by a linear series method, power is dissipated in the transistors. This amounts to $$P_{\text{diss.}}=(V_s-V_p)\ I_c$$

where $V_p$ is the desired regulated value of the transformer primary voltage and $I_c$ is the transistor collector currents under full load. The power dissipated in accordance to the above equation is the total power dissipated by two transistors with one half of the power being dissipated by each transistor. In view of this load sharing characteristic, a conventional series regulator would require two parallel connected transistors to equal the dissipation capabilities of this circuit for similar operating conditions. It should be noted that the transistor load or dissipation sharing properties of the circuit are based on time division of the load and not on similarity of transistor linear properties as in the case of parallel or series connected transistors in conventional regulators. Load sharing is easily obtainable with the circuit of FIGURE 14 even when the linear characteristics of the switching transistors are widely different.

Figure 15:
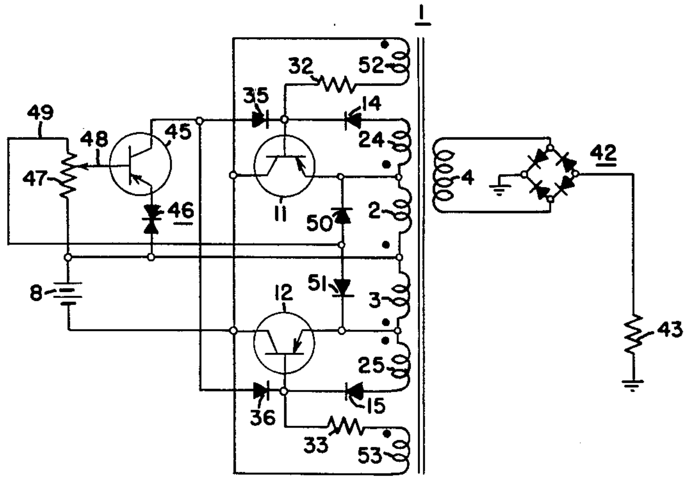
FIGURE 15 is a schematic diagram of a transistor converter employed as a series regulator with input regulation.

The circuit of FIGURE 14 is only one example of the use of a base control converter for linear regulation purposes. The circuit may additionally be modified as illustrated in FIGURE 15 so as to achieve converter input regulation with the potential applied to the magnetizing windings 2 and 3 being maintained constant. The circuit of FIGURE 15 corresponds to that of FIGURE 14 with the exception of the feedback circuit connected through line 49 to potentiometer 48. Feedback is obtained from the emitter circuits of transistors 11 and 12 through diodes 50 and 51 whose cathodes are connected to the emitter-electrodes of transistors 11 and 12, respectively, and whose anodes are jointly connected to line 49. With such connection, nearly instantaneous regulation of the primary winding voltage is obtained, and in many cases transient overshoots of this converter square wave are corrected by the regulator action. Diodes 50 and 51 serve to switch the emitter electrode of the proper one of the converter transistors to the regulator circuit at the proper time. Thus, when transistor 11 is conducting, the diode 50 connects the emitter output of transistor 11 to the regulator circuit which in turn applies the appropriate base drive voltage to transistor 11 through diode 35. Diodes 51 and 36 are nonconducting during this time. Similar action occurs during the other half cycle when transistor 12 and its associated diodes 51 and 36 conduct.

In one particular operative embodiment of the invention shown in FIGURE 15, where it is desired to obtain a 350 volt, 20 watt output from a 28 volt source, the following components may be employed. The values are given only for purposes of illustration and are not to be construed as being limiting:

| | |
|---|---|
| Converter transistors 11 and 12 | Type H-7, manufactured by Minneapolis Honeywell, Inc. |
| Amplifier transistor 45 | Type 2N43. |
| Diodes 14 and 15 | Type 1N91. |
| Diodes 35, 36, 50 and 51 | Type 1N191. |
| Source of direct potential 8 | 28 volts. |
| Reference diode 46 | 3 serially connected types 1N429. |
| Transformer 1 core | Orthonal tape wound core material #50133 Manufactured by Magnetics, Inc. |
| Primary windings 2 and 3 | 80 turns each. |
| Output winding 4 | 1400 turns. |
| Feedback windings 24 and 25 | 16 turns each. |
| Boost windings 52 and 53 | 200 turns each. |
| Impedances 32 and 33 | 2,500 ohms. |
| Potentiometer 47 | 2,700 ohms, adjusted so that impedance between line 49 and tap 48 is approximately 250 ohms. |

The embodiment is designed so that the potential across each primary winding is maintained at 20 volts, which with the indicated primary-output winding turns ratio provides the desired output voltage of 350 volts. The average collector-emitter potential of converter transistors 11 and 12 is therefore the difference between the source 8 voltage and the primary winding voltage and thus equals in the instant case 8 volts. Since the emitter-electrode potential corresponds to the base electrode potential, the latter should be designed for 8 volts. Additionally it may be seen that the emitter-collector output of the converter transistors ocrresponds to the quotient of the output power and the emitter-collector voltage. Since the circuit losses, including the core current losses, are relatively small, transistor power may be assumed to be 20 watts, the emitter-collector current is thus 1 amp, and the total converter transistor power dissipation is thus 8 watts. Assuming a transistor current gain of 50 this results in a base current of 20 milliamperes. If the effect of the boost windings 52 and 53 is neglected, the magnitude of impedances 32 and 33 corresponds to the quotient of the base-collector voltage, 8 volts, and the base current, 20 ma., which is 400 ohms. The boost windings 52 and 53 are used in order to increase the gain of the preceding amplifying transistor 45 by increasing its collector impedances. The 200 turns of the boost windings provide a base-collector potential of 50 volts, so that with a 20 ma. base current, the magnitude of impedances 32 and 33 is increased to 2,500 ohms.

The choice of input or output regulation is dependent upon the application. Output regulation is desirable when large load variations are anticipated and only one regulated output voltage is required. Output regulation on the other hand is not instantaneous but is delayed by the output filter time constant.

Figure 16:
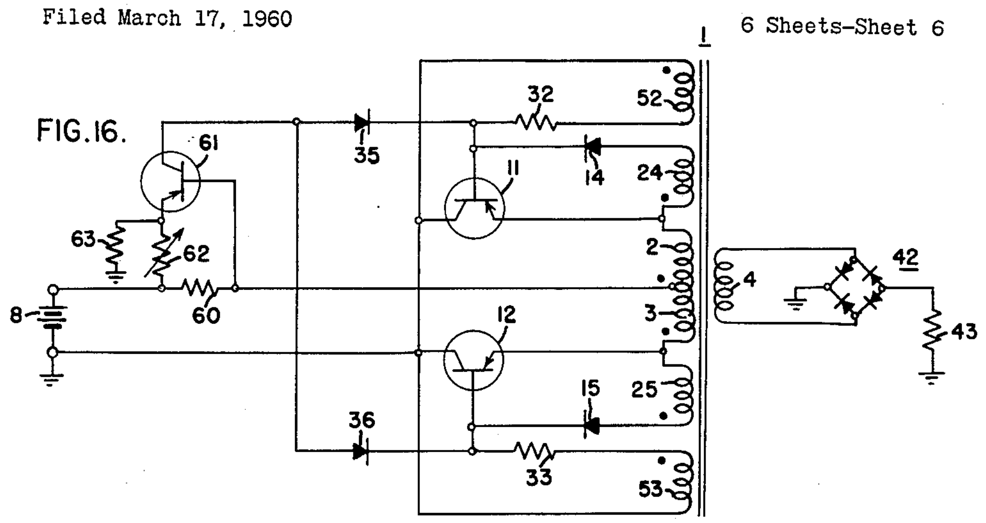
FIGURE 16 is a schematic diagram of a transistor converter circuit employed as a series regulator and providing a current limited output.

In FIGURE 16 is shown an embodiment of a current limiting base-controlled converter circuit connected in a common collector shunt feed configuration. The circuit is related to the one shown in FIGURE 15, but provides a current limited output in lieu of voltage regulation. The circuit is useful in those applications wherein the load current may tend to exceed an allowable value, causing heating and other undesirable effects. For example, in changing loads or in charging loads possessing a large capacitance, the initial load impedance may be so low as to cause a large surge of current in the regulated supply such as would damage the transistors or the loading device.

A current sensing resistor 60 is connected between the positive terminal of source 8 and the common terminal between windings 2 and 3. A current controlling transistor 61 is connected in the base drive circuit of transistors 11 and 12 replacing the third transistor 45 of FIGURE 15. The voltage developed across resistor 60, which is proportional to the output current, is connected from the junction of resistor 60 and windings 2 and 3 to the base electrode of transistor 61 and controls the conductivity of this transistor. The emitter electrode of transistor 61 is connected to the junction of resistors 62 and 63. Resistors 62 and 63 are connected between the positive terminal of source 8 and ground and provide a reference voltage to said emitter. A voltage reference diode can replace resistor 62 if a more accurate reference voltage is required. The remaining components of the circuit are connected as described with relation to the circuit of FIGURE 15 and provide the same function as in that circuit.

In the operation of the circuit of FIGURE 16, transistor 61 will conduct only when the output current tends to exceed a predetermined value. This value is established by the choice of current sensing resistor 60 and the voltage reference resistors 62 and 63. It is readily varied by adjusting the value of resistor 62.

For the condition when the output current is less than said predetermined value, transistor 61 does not conduct and effectively exhibits an open circuit to the base drive supplied from boost windings 52 and 53. Thus, the circuit operates similarly to the foregoing systems, except that the bias signal controlling the conduction of transistors 11 and 12 is not varied by an input signal. Rather, the bias required to sustain and control transistor conduction is supplied solely from boost windings 52 and 53 through resistors 32 and 33 respectively. During this portion of the operation transistors 11 and 12 assume a maximum level of conduction.

When the load increases beyond a limiting condition, the primary current accordingly increases and the voltage at the base of transistor 61 will fall below the reference voltage at the emitter causing transistor 61 to conduct. Since transistor 61 is effectively connected in parallel with the bias sources, windings 52 and 53, the conduction of said transistor removes a part of the base drive current supplied through resistors 32 and 33. This decreases the conduction of transistors 11 and 12, placing a larger voltage across these transistors which reduces the voltage in primary windings 2 and 3. Hence the output voltage is reduced. Any further tendency for the load current to increase causes greater conduction of transistor 61 which further decreases the conduction of transistors 11 and 12. This reduces the output voltage as required to maintain the current limiting condition. As the load is reduced below the limiting point, the voltage at the base of transistor 61 will cause said transistor to be cut off and removed once again from the base drive circuits of transistors 11 and 12.

Figure 17:
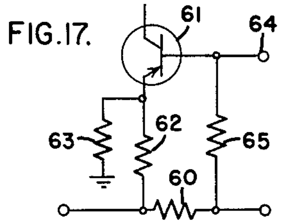
FIGURE 17 is a chematic diagram of a modified portion of the circuit of FIGURE 16.

FIGURE 17 shows a modification of the circuit of FIGURE 16 wherein an auxiliary input signal may be connected to the base electrode of current limiting transistor 61. This auxiliary input signal is connected to terminal 64 and is developed across resistor 65 which is inserted between the base electrode and the terminal of resistor 60 that is joined to windings 2 and 3. Thus, the transistor 61 in addition to responding to current limiting, may concurrently provide another form of control. For example, the auxiliary signal may be a voltage regulating signal, being readily connected from conductor 49 in FIGURES 14 and 15, or the signal may be a low frequency A.C. signal which it is desired to amplify.

Figure 18:
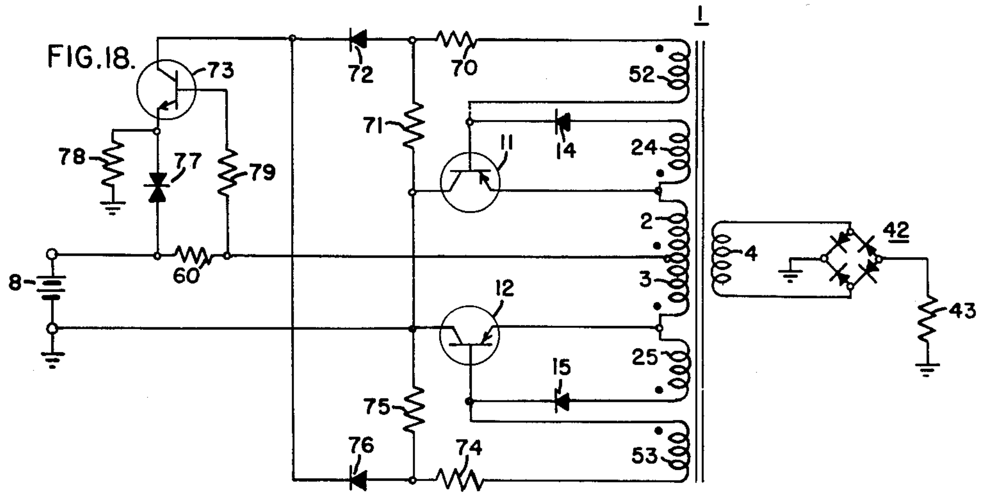
FIGURE 18 is a schematic diagram of a transistor converter employed as a series regulator and providing a constant current output.

In FIGURE 18 is illustrated a further embodiment of applicant's base-controlled transistor converter circuit which provides a constant current output. The primary current paths including current sensing resistor 60, transistors 11 and 12, primary windings 2 and 3 and cut off windings 24 and 25 are connected as in FIGURE 16. However, in this embodiment the third transistor 73 acts to provide a constant control rather than current limiting action. Transistor 73 is connected in series with the sources of bias current (boost windings 52 and 53) and the base-emitter paths of transistors 11 and 12, rather than in parallel with the bias current sources as in FIGURE 16.

Winding 52 is thus connected from the base electrode of transistor 11 through resistors 70 and 71 to ground, the junction of resistors 70 and 71 being connected through diode 72 to the collector electrode of the NPN current control transistor 73. Diode 72 is poled to connect positive voltage to the collector of transistor 73. Winding 53 is similarly connected between the base electrode of transistor 12 and ground through resistors 74 and 75, and the junction of these resistors is connected through diode 76 to the collector electrode of transistor 73. Diode 76 is poled in the same direction as diode 72. A reference voltage device, shown to be a pair of back-to-back Zener diodes 77 but which may be a resistor as in FIGURE 16, connects the emitter electrode of transistor 73 to the positive terminal of source 8, the emitter also being connected through resistor 78 to ground. Thus, the emitter is maintained at a fixed reference voltage with respect to the end of resistor 60 connected to the positive terminal of source 8. The base electrode of transistor 73 is connected through resistor 79 to the junction of resistor 60 and windings 2 and 3. Thus, the voltage drop across resistor 60 is compared to the fixed reference voltage to control the conductivity of transistor 73.

In the operation of the circuit of FIGURE 18, transistors 11 and 12 alternately conduct to provide a square wave output voltage, as in the previous embodiments. The base-controlled circuits of transistors 11 and 12 control the "on" portion of the transistor operation so as to provide a constant current output. Thus, as the output current tends to increase beyond the selected output value, transistor 73 conducts less. Assuming transistor 11 is in the "on" condition, the base drive will decrease under the influence of transistor 73 and the output current will be maintained at the desired value. As the output current tends to decrease below the desired value, the conduction of transistor 73 increases which increases the base drive of transistor 11. Thus, the output current is kept constant. During that portion of the cycle when transistor 12 is conducting a similar control is effected. Resistors 70, 71 and 74, 75 set limits for the base drive signals of transistors 11 and 12, maintaining the transistor operation within a desired operating range. In a simplified circuit they can be omitted. Resistors 70 and 74 are then short circuited and resistors 71 and 75 open circuited.

It is apparent that the modification shown in FIGURE 17 may likewise be employed with the circuit of FIGURE 18, so that an auxiliary control signal may concurrently be connected to the base of transistor 73, if desirable. It should be understood that although FIGURES 14 to 18 illustrate common collector shunt feed base-controlled transistor converters, the current control circuits herein disclosed are also applicable to base-controlled transistor converter circuits of common base or common emitter configuration and employing a shunt or series fed control signal to the base electrodes. It is further noted that for optimum operation of the various base-controlled transistor converter embodiments disclosed, it is desirable that the saturable core structures 1 have a substantially rectangular hysteresis curve characteristic. This provides a fast and accurate timing of the switching between transistors 11 and 12, necessary for many applications of the circuits.

It is obvious that in addition to the above-disclosed uses of base-controlled converters for linear regulation purposes, there are many other combinations which employ the common-collector, common-emitter and common-base form of the converter and there are also many other applications of base-controlled converters.

While principles of the invention have now been clear, there will be immediately obvious to those skilled in the art many modifications of the structure, arrangement, proportions, the elements and components used in the practice of the invention, and otherwise, which are particularly adapted to the specific environments and operating requirements without departing from those principles. The appended claims are therefore intended to cover and embrace any such modification within the limits of the true spirit and scope of the invention.

What I claim as new and desire to secure by Letters Patent of the United States is:

1. In combination, a saturable core having coupled thereto a pair of primary windings, and a secondary winding, a source of direct potentials, a pair of semiconductor devices each having a base electrode and each providing a path of controllable conductivity between said source and an associated primary winding and providing core magnetizations in opposite senses, cut off signal means responsive to current flowing in each one of said semiconductor devices for inhibiting conduction of the other of said semiconductor devices, said cut off means being coupled to the base electrode of each of said semiconductor devices through separate unilaterally conducting paths permitting only conduction inhibiting voltages to be applied to said base electrode, biasing means coupled with said base electrodes for establishing a normally conducting conduction level in said semiconductor devices, output means, and means for coupling said output means to said secondary winding.

2. The apparatus of claim 1 including feedback means coupled between said output means and said biasing means so as to establish the conduction level of said semiconductor devices as a function of the output signal in said output means.

3. In combination, a saturable core having coupled thereto a pair of primary windings, a secondary winding, and a pair of tertiary windings, a source of direct potentials, a pair of semiconductor devices each having a base electrode and each providing a path of controllable conductivity between said source and an associated primary winding and providing core magnetizations in opposite senses, a pair of unilaterally conducting devices each connected between one base electrode and one tertiary winding for permitting only conduction inhibiting voltages to be applied to said base electrodes, said tertiary windings being oriented to that conduction of one semiconductor device tends to drive the other semiconductor device into a state of nonconduction, biasing means coupled with said base electrodes for establishing a normally conducting conduction level in said semiconductor devices, and output means coupled to said secondary winding.

4. An electric system of the type in which a pair of windings on a saturable core are alternately switched by means of alternately conducting semiconductor devices to a source of direct current so as to effect opposing directions of magnetization comprising, a source of direct potentials, a first and a second winding wound on a saturable core, a first and a second semiconductor device having at least three electrodes, means for serially connecting said first winding and said first device through a pair of said electrodes to said source, means for serially connecting said second winding and said second device through a pair of said electrodes to said source, rectifying means, means for cutting off the conducting one of said semiconductor devices comprising means connected serially with said rectifying means for alternately applying unidirectional potential signals of a first polarity between the third of said electrodes and one of said pair of electrodes of each device, input signal means for varying the voltage drop across the pair of electrodes of at least said first semiconductor device during its conduction time coupled between the third of said electrodes and said one of said pair of electrodes of at least said first device.

5. An electric system of the type in which first and second windings on a saturable core are alternately energized from a source of direct potential through a pair of electrodes of first and second alternately conducting controllable impedance semiconductor devices each having at least three electrodes and being connected respectively in series with said first and said second winding and wherein the nonconducting one of said devices is cut off by a cut off potential applied for substantially the duration of the flux change in the core, means for controlling the potential applied to at least said first winding comprising control terminals connected to one of said pair of electrodes and a third of said electrodes of at least said first semiconductor device, rectifying means, means for applying said cut off potential through the rectifying means to said control terminals, a source of control potential coupled to said control terminals, whereby the magnitude of said control potential controls said impedance of the associated semiconductor device during its conduction.

6. An electric system comprising a source of direct potential, a magnetic core, first, second and third winding means linking the core and inductively related to one another, a pair of semiconductor devices each having a base electrode, an emitter electrode, and a collector electrode, means for connecting said first winding means to said source through separate paths so as to effect opposing directions of magnetization, each of said paths including the emitter and collector electrodes of a separate one of said devices, said core being constructed for saturation in the range of energization of said first winding means, means for controlling the energization potential applied across said first winding means comprising, a source of control potential, a pair of impedance means, a separate one of said impedance means being connected serially with the base electrode of each of said devices, means for connecting said source of control potential in series circuit, with the respective one of said impedance means between the base electrode and the emitter electrode of each of said devices, means for alternately disconnecting one of said separate paths comprising a pair of rectifying means, means for serially connecting said second winding means through a separate one of said rectifying means across each of said impedance means, said rectifying means being poled to supply an alternately occurring signal of a polarity so as to bias to cut off the device serially connected to the rectifying means, output means connected to said third winding.

7. An electric system comprising a source of direct potential, a magnetic core, a pair of primary winding means, cut off winding means, and output winding means, all of said winding means linking the core in inductive relationship, a pair of semiconductor devices each having a base electrode, an emitter electrode, and a collector electrode, means for connecting each of said primary winding means across said source so as to effect opposing directions of magnetization, means for inserting the collector electrode and emitter electrode of one of said semiconductor devices in series circuit with a separate one of said magnetizing winding means, said core being constructed for saturation in the range of energization of said magnetizing winding means, first and second impedance means, said impedance means being connected serially across said source, a pair of third impedance means, each of said third impedance means being connected between the junction of said first and second impedance means and the base electrode of a separate one of said semiconductor devices so as to normally bias the base electrode of said semiconductor devices for conduction, means for alternately cutting off said semiconductor devices comprising a pair of rectifying means, means for connecting said cut off winding means through a separate one of said rectifying means across each of said third impedance means, said rectifying means being oriented to prevent said cut off winding means from providing a forward bias to the base electrode of said semiconductor devices, output means connected to said output winding means.

8. The apparatus of claim 7 in which input signal means are connected across said first impedance means, so as to control the signal amplitude supplied to said output winding means.

9. An electric system comprising a serially connected first and a second source of direct potential, a magnetic core, a pair of primary winding means, cut off winding means, and output winding means, all of said winding means linking the core in inductive relationship, a pair of semiconductor devices each having a base electrode, an emitter electrode and a collector electrode, first impedance means, means for connecting said impedance means to the emitter electrode of each of said semiconductor devices, the collector electrode of each of said semiconductor devices being connected to a separate one of said primary winding means, means for connecting each of said primary winding means in series combination with one of said semiconductor devices and said first impedance means across the series combination of said first and second source so as to effect opposing directions of magnetization, each one of said semiconductor devices being in series circuit with a separate one of said primary winding means, said core being constructed for saturation in the range of energization of said primary winding means, a pair of second impedance means, each of said second impedance means being connected between the junction of said first and second source and the base electrode of a separate one of said semiconductor devices so as to normally bias the base electrode of said devices for conduction, means for alternately cutting off said semiconductor devices comprising a pair of rectifying means, means for connecting said cut off winding means through a separate one of said rectifying means across each of said second impedance means, said rectifying means being oriented to prevent said cut off winding means from providing a forward bias to the base electrode of said devices, output means connected to said output winding means.

10. The apparatus of claim 9 wherein input signal means are connected across said first impedance means so as to control the signal amplitude supplied to said output winding means.

11. An electric system comprising a source of direct potential having a first and a second terminal, a magnetic core, a pair of primary winding means, cut off winding means, and output winding means, all of said winding means linking the core in inductive relationship to one another, a pair of semiconductor devices each having a base electrode, an emitter electrode, and a collector electrode, means for connecting each one of said primary winding means in series circuit with the emitter electrode and collector electrode of a separate one of said semiconductor devices to the first and second terminal of said source so as to effect opposing directions of magnetization, said core being constructed for saturation in the range of energization of said primary winding means, said semiconductor devices being oriented so that said collector electrodes are in circuit with said first terminal and said emitter electrodes are in circuit with said second terminal, a pair of first impedance means, each of said first impedance means being connected from said first terminal to the base electrode of a separate one of said semiconductor devices, a pair of second impedance means, each of said second impedance means being connected from said second terminal to the base electrode of a separate one of said semiconductor devices, said first and second impedance means being proportioned so as to establish a normal quiescent bias for said base electrodes for conduction, means for alternately cutting off said semiconductor devices comprising a pair of rectifying means, means for connecting said cut off winding means through a separate one of said rectifying means across the base electrode and the emitter electrode of each of said semiconductor devices, said rectifying means being oriented to prevent said cut off winding means from providing a forward bias to the base electrode of said semiconductor devices, output means being connected to said output winding means.

12. The apparatus of claim 11 in which said second impedance means comprise rectifying means poled in the direction of normal source current flow, and in which input signal means are connected in said base circuit for controlling current conduction.

13. An electric circuit for converting direct voltage to alternating voltage comprising a source of direct voltage, a saturable core transformer having first and second input windings and an output winding, first and second alternately conducting amplifier devices each having a control element, said devices being connected in circuit respectively with said first and second input windings for coupling varying amounts of the source voltage across said input windings, unilaterally conducting means for alternately applying cut off potentials to one of said amplifier devices in response to conduction of said other amplifier device, and control means for controlling the conduction of said devices during the conducting portion of their operation, said control means including comparison means for comparing a monitored electrical output quantity with a reference quantity for developing a comparison signal which is applied to the control elements of said first and second amplifier devices for controlling the conductivity thereof in accordance with said output quantity.

14. An electric circuit as in claim 13 wherein said amplifier devices are semiconductor devices.

15. An electric circuit as in claim 14 wherein said unilaterally conducting means includes a pair of feedback windings in which are induced said cut off potentials, said feedback windings each being connected by a diode to respective control elements of said first and second semiconductor devices.

16. An electric circuit as in claim 15 wherein said control means also includes a pair of additional feedback windings for deriving voltages responsive to current flow in said primary windings, said feedback windings being connected to the control elements of said first and second semiconductor devices for applying a bias current thereto, said comparison means acting to provide a variation in said bias current for establishing varying levels of conductivity in said first and second semiconductor devices.

17. An electric circuit as in claim 16 wherein said comparison means is a transistor device having two input electrodes and an output electrode, said reference quantity being connected to one input electrode and said monitored output quantity being connected to the other input electrode, the output electrode being coupled to said control elements, the differential between said reference and output quantities controlling the conduction of said transistor, whereby the conduction of said transistor serves to vary the bias current to said first and second semiconductor devices.

18. An electric circuit as in claim 17 wherein said alternating voltage is supplied to an output load and said monitored output quantity is the output voltage.

19. An electric circuit as in claim 17 wherein said monitored output quantity is obtained from a voltage sensing resistor connected in parallel with said first and second input windings which senses the output load voltage so as to provide a regulated output voltage.

20. An electric circuit as in claim 17 wherein said alternating voltage is supplied to an output load and said monitored quantity is obtained from a current sensing resistor which senses the output load current, said resistor being connected in said circuit with said first and second semiconductor devices and said first and second input windings.

21. An electric circuit as in claim 20 wherein said transistor device is connected in parallel with said additional feedback windings for shunting a controlled portion of the bias current from said first and second semiconductor devices, said transistor being normally in a nonconducting state becoming conductive when the output current exceeds a predetermined value so as to provide a current limited output.

22. An electric circuit as in claim 20 wherein said transistor device is connected in series with said additional feedback windings for controlling the bias current to said first and second semiconductor devices so as to provide a constant output current.

23. An electric circuit for converting a source of direct voltage into an alternating voltage which is supplied to an output load comprising first and second alternately conducting transistor devices each having base, emitter and collector electrodes, a saturable core transformer having first and second input windings and an output winding, means for serially connecting said source and the emitter and collector electrodes of said first transistor device to said first input winding to provide a first current path, further means for serially connecting said source and the emitter and collector electrodes of said second transistor device to said second input winding to provide a second current path, a pair of feedback windings for deriving voltages responsive to current flow in said primary windings, each of said feedback windings being respectively connected by a diode between the emitter and base electrodes of said first and second transistor devices for alternately cutting off the conduction of one of said devices in response to conduction of the other of said devices, a pair of additional feedback windings for deriving voltages responsive to current flow in said primary windings, each of said feedback windings being respectively connected to the base electrodes of said first and second devices providing bias current thereto for establishing a level of conductivity in said devices, a third transistor device having base, emitter and collector electrodes, the collector and emitter electrodes of said third transistor device being connected in a current path with said additional feedback windings for varying the bias current supplied to said first and second devices, said third transistor device having a reference voltage connected to the emitter electrode thereof and a monitored voltage which is a function of the output condition connected to the base electrode thereof, the differential between said reference and monitored voltages controlling the conduction of said third transistor device thereby varying said bias current whereby the level of conductivity of said first and second transistor devices is controlled in accordance with said output condition.

24. An electric circuit as in claim 23 wherein the collector and emitter electrodes of said third transistor devices are connected by a pair of diodes in parallel with said pair of additional feedback windings for shunting a controlled portion of the bias current from said first and second transistors and wherein said monitored voltage is obtained from a voltage sensing resistor connected in parallel with said output load which senses the output load voltage so as to provide a regulated output voltage.

25. An electric circuit as in claim 24 wherein the collector and emitter electrodes of said third transistor device are connected by a pair of diodes in parallel with said pair of additional feedback windings for shunting a controlled portion of the bias current from said first and second transistors and wherein said monitored voltage is obtained from a current sensing resistor connected in said first and second current paths which senses the output load current so as to provide a current limited output.

26. An electric circuit as in claim 23 wherein the collector and emitter electrodes of said third transistor device are connected by a pair of diodes in series with said pair of additional feedback windings for controlling the flow of said bias current and wherein said monitored voltage is obtained from a current sensing resistor connected in said first and second current paths which senses the output load current so as to provide a constant output current.

References Cited in the file of this patent

UNITED STATES PATENTS

| | | |
|---|---|---|
| 2,772,370 | Bruce et al. | Nov. 27, 1956 |
| 2,785,236 | Bright et al. | Mar. 12, 1957 |
| 2,883,539 | Bruck et al. | Apr. 21, 1959 |